US00RE44271E

(19) United States
(12) Reissued Patent
Keeter

(10) Patent Number: US RE44,271 E
(45) Date of Reissued Patent: Jun. 11, 2013

(54) FINISHED SLOT AND ADJUSTABLE SHIRT COLLAR AND METHOD OF MANUFACTURING SAME

(75) Inventor: Jim Keeter, New York, NY (US)

(73) Assignee: Capital Mercury Apparel, Ltd., New York, NY (US)

(21) Appl. No.: 13/403,817

(22) Filed: Feb. 23, 2012

Related U.S. Patent Documents

Reissue of:
(64) Patent No.: 8,065,747
Issued: Nov. 29, 2011
Appl. No.: 11/255,987
Filed: Oct. 24, 2005

U.S. Applications:
(63) Continuation-in-part of application No. 10/842,556, filed on May 11, 2004, now abandoned.

(51) Int. Cl.
*A41B 3/02* (2006.01)

(52) U.S. Cl.
USPC ..... 2/141.1; 2/141.2; 2/129

(58) Field of Classification Search
USPC ..... 2/129, 141.1, 141.2, 131, 132, 116, 2/60, 98, 100, 265, 266, 222, 220, 221, 405, 2/235, 274, 275
See application file for complete search history.

(56) References Cited

U.S. PATENT DOCUMENTS 418,639 A * 12/1889 Batter ..... 2/127
514,415 A * 2/1894 Cook ..... 2/266
912,958 A * 2/1909 Hawks ..... 24/101 R
1,086,451 A * 2/1914 Glasgow ..... 2/127
1,280,673 A * 10/1918 Cree ..... 2/141.2
1,280,742 A * 10/1918 Hurd ..... 2/131
1,313,932 A * 8/1919 Warshauer ..... 2/116
1,814,760 A * 7/1931 Miller, Jr. ..... 2/265
1,879,527 A * 9/1932 Sansone ..... 2/127
1,945,104 A * 1/1934 Zilinsky ..... 112/405
1,953,429 A * 4/1934 Newell ..... 2/141.1
1,963,004 A * 6/1934 Tucker ..... 2/127
1,982,527 A * 11/1934 Manekin ..... 2/116
2,025,485 A * 12/1935 Tucker ..... 2/127
2,318,295 A * 5/1943 Davidow ..... 2/93
2,368,272 A * 1/1945 Sydenham et al. ..... 2/458
2,385,638 A * 9/1945 Norwood ..... 2/116
2,585,689 A * 2/1952 Schafer ..... 2/127
2,646,570 A * 7/1953 Rinehart et al. ..... 2/116
2,709,813 A * 6/1955 Clendenin, Jr. ..... 2/130
2,713,686 A * 7/1955 Oster et al. ..... 2/266
2,893,012 A * 7/1959 Kahn ..... 2/116
3,142,843 A * 8/1964 Berger ..... 2/128
3,170,165 A * 2/1965 Wise ..... 2/116

(Continued)

*Primary Examiner* — Alissa L Hoey
(74) *Attorney, Agent, or Firm* — Arent Fox LLP

(57) ABSTRACT

An adjustable collar having a finished slot through which a fabric strip passes unimpeded. A pair of flaps is formed by an outer band of the collar and abut the finished slot. The fabric strip is secured to a free end of an elastic strip, which is secured to a shirt band at a first end of the elastic strip. A button is secured to a free end of the fabric strip and the button passes through a horizontal buttonhole defined in an end of an outer portion of a neckband of the shirt. The fabric strip is retracted and hidden when the collar is open. The button is larger than a diameter of the finished slot to prevent the fabric strip from retracting completely therethrough.

17 Claims, 4 Drawing Sheets

U.S. PATENT DOCUMENTS 3,394,437 A * 7/1968 Sinclair ..... 24/301
3,430,264 A * 3/1969 Beukenkamp, Jr. ..... 2/116
3,536,554 A * 10/1970 Weiss ..... 24/659
3,547,060 A * 12/1970 Lepore ..... 112/431
3,587,501 A * 6/1971 Cruden ..... 12/475.25
3,629,866 A * 12/1971 Blue ..... 2/132
3,654,635 A * 4/1972 Cruden, Jr. ..... 2/266
3,675,279 A * 7/1972 Moden ..... 24/659
3,701,167 A * 10/1972 Spetz ..... 2/266
3,703,149 A * 11/1972 George ..... 112/475.25
3,725,959 A * 4/1973 Cruden ..... 2/247
3,793,647 A * 2/1974 Spetz ..... 2/266
3,806,955 A * 4/1974 Weyrick et al. ..... 2/266
3,828,365 A * 8/1974 Berger ..... 2/128
4,000,522 A * 1/1977 Swanson ..... 2/116
4,445,233 A * 5/1984 Rubin ..... 2/239
4,648,137 A * 3/1987 Cooper ..... 2/116
4,670,908 A * 6/1987 Albert ..... 2/139
4,825,472 A * 5/1989 Garafano ..... 2/116
5,029,345 A * 7/1991 Angheluta et al. ..... 2/403
5,481,995 A * 1/1996 Hiratsuka et al. ..... 112/437
5,669,078 A * 9/1997 Scremin et al. ..... 2/247
5,692,240 A * 12/1997 Steele ..... 2/129
5,898,941 A * 5/1999 Groshens ..... 2/129
5,950,240 A * 9/1999 Carpenter et al. ..... 2/160
6,018,822 A * 2/2000 Hernandez ..... 2/405
6,057,253 A * 5/2000 Groshens ..... 442/313
6,081,926 A * 7/2000 Krause et al. ..... 2/129
6,212,686 B1 * 4/2001 Krause et al. ..... 2/129
6,250,116 B1 * 6/2001 Groshens ..... 66/171
6,279,161 B1 * 8/2001 Johnston ..... 2/69
6,401,257 B1 * 6/2002 Tsuruta ..... 2/266
6,434,802 B1 * 8/2002 Pannone ..... 24/306
6,449,772 B1 * 9/2002 Donner ..... 2/170
6,874,164 B2 * 4/2005 Droppo et al. ..... 2/141.2
6,986,165 B2 * 1/2006 Neff et al. ..... 2/141.2
7,310,825 B2 * 12/2007 St-Germain ..... 2/123
8,065,747 B2 * 11/2011 Keeter ..... 2/141.1
2004/0181845 A1 * 9/2004 Droppo et al. ..... 2/141.2
2005/0022287 A1 * 2/2005 Neff et al. ..... 2/129
2005/0125876 A1 * 6/2005 Kato ..... 2/129
2005/0210561 A1 * 9/2005 Robinson ..... 2/129
2005/0251891 A1 * 11/2005 Keeter ..... 2/129

* cited by examiner

FINISHED SLOT AND ADJUSTABLE SHIRT COLLAR AND METHOD OF MANUFACTURING SAME

Matter enclosed in heavy brackets [ ] appears in the original patent but forms no part of this reissue specification; matter printed in italics indicates the additions made by reissue.

CROSS-REFERENCE TO RELATED APPLICATION

This is a continuation-in-part application of application Ser. No. 10/842,556, filed May 11, 2004 now abandoned.

BACKGROUND OF THE INVENTION

1. Field of the Invention

The present invention relates to a finished slot and an adjustable shirt collar and a method of manufacturing the same. More particularly, the present invention related to a finished slot that works in cooperation with an elastic strip that self-adjusts a circumference of the shirt collar to provide a comfortable fit while simultaneously providing the shirt collar with an opening that is more secure, better quality, and has a longer life.

2. Description of Related Art

There are occasions when people need to expand the collar of the shirt they are wearing to obtain a comfortable fit. Shirts with permanently attached collars, particularly dress shirts, are normally manufactured in standard collar sizes based on the circumference of the collar. Although standard collar sizes may initially provide a comfortable fit, many individuals who fall between standard collar sizes or experience a change in weight over time may experience discomfort when wearing the shirt. Moreover, it is well known that clothing, i.e., shirts, shrink after several washings, which also results in a change in the actual size of the shirt collar, whereupon, it becomes uncomfortable to wear the shirt. Therefore, an adjustable shirt collar becomes necessary to ensure that shirts may adjust to fit the wearer comfortably.

Various solutions to this problem have been offered in the art. One known solution offers collar adjustment using an adjustable shirt collar fastening device having an elastic strip secured between the lining and the ply of the collar by stitches. A button is attached at the end of the elastic strip, which is maneuverable so as to pass through a horizontal buttonhole in the collar. Additionally, a U-shaped metal cap is adapted to prevent the elastic strip from inadvertently entering or being drawn into or through the horizontal buttonhole. A finished fabric strip folds over the elastic strip and the button. Although this solution offers collar expansion, a wearer may desire to conceal the elastic strip if the top button is unbuttoned to provide a neater and arguably more professional appearance.

Another known solution is a shirt having a fixed unit, which contains a relatively short and resilient strap vertically disposed and bent back onto itself. A button is attached to the end of the strap by stitching. Additionally, two tabs of the collar shift together allowing the button to pass through a buttonhole to hold the tabs together. The collar extends when the strap is stretched outwardly through the opening of the inner tab and through the buttonhole. The strap is oriented orthogonally relative to the collar band. Therefore, to relieve discomfort, the collar is adjusted by stretching the strap outwardly through the horizontal buttonhole. Because such adjustment is due to a force that pulls the button and the strap outward rather than the more natural side-to-side movement of the button and strap, the fit may still be uncomfortable as the button presses against the front center portion of a wearer's throat. Moreover, because the strap is attached orthogonally relative to a longitudinal axis of the buttonhole, any sideways movement of the strap results in the button loosening, or the alteration of the stitching holding the strap to the collar, or both.

Other solutions are disclosed by U.S. Pat. No. 912,958 to H. S. Hawks; U.S. Pat. No. 1,879,527 to J. Sansone; and U.S. Pat. No. 3,142,843 to S. Berger. Each patent describes a collar button structured to relieve pressure on the neck of the wearer without using an expanding strip.

Additionally, U.S. Pat. No. 6,212,686 to Krause et al., as well as U.S. Pat. Nos. 5,898,941 and 6,250,116 to Groshens disclose solutions using expandable fabric weaves, expandable fabric patterns, expandable fabric weaves and patterns, or stitching in the collar to provide the necessary expansion.

U.S. Pat. No. 5,692,240 to Steele discloses another solution wherein the stationary collar button is replaced with adjustable hook and loop fasteners adapted for removable attachment to one another. A third hook and loop fastener strip allows the covering strip to be retracted and attached for concealment. However, the solution taught by Steele requires several manufacturing steps that result in a substantial increase in manufacturing costs, which are passed along to consumers. Additionally, the hook and loop fasteners become less effective after multiple washings because the hook and loop fasteners ability to lockingly engage is impeded by the friction that occurs during the washing process. Furthermore, it is well known that the hook and loop fasteners inadvertently attach to other items that may cause a build up of threads or particles, which reduces the effectiveness or the aesthetic appearance of the fasteners.

U.S. Pat. No. 3,828,365 to Berger merely discloses an expandable buttonhole. Furthermore, U.S. Pat. No. 2,646,570 to E. Rinehart et al. discloses a shirt having an elastic cord covered with fabric. A loop at the end of the elastic cord extends across the collar opening to attach to one of several buttons under the collar on the opposite side of the collar.

In yet another example, U.S. Patent Application Publication No. 2005/0022287 to Neff et al. (Neff) teaches an expandable collar assembly 10 having parallel lines of stitching 32 and 34 that define a pocket between a collar band 16 and body 12 of the shirt. A slot 36 formed in a manner similar to a buttonhole is located in the pocket and an elongated strip of self fabric 42 extends through the slot 36 with a button 38 attached to one end of the elongated strip of fabric 42. The other end of the elongated strip of fabric 42 is stitched to a square piece of elastic 45. The other end of the square piece of elastic 45 is bar tacked 48 to the body 12 of the shirt or the collar band 16.

Many of the solutions described above are susceptible to deterioration or create constrictive pressure on the throat of the wearer. Additionally, the solutions do not allow the wearer to conceal the apparatus when the collar is unbuttoned and left open. Furthermore, the solutions described above, in particular the teachings of Neff, suffer from the adjusting strip washing out and, because the slot 36 of Neff is formed like a buttonhole, the edges of the slot 36 fray due to the friction created by the self fabric 42 repeatedly rubbing against the edges of the slot 36, as well as the shirt being constantly washed.

Therefore, there is a need for an expandable shirt collar that adjusts the fit of the collar without placing undesirable and unnecessary pressure on the throat of the wearer, while providing a finished slot that works in cooperation with an elastic strip that self-adjusts a circumference of the shirt collar. There is also a need for the finished slot to be sturdy, and have edges that are resilient to the friction that is created by a strip of fabric that constantly rubs against the edges to provide a better quality and longer lasting adjustable or expandable shirt collar. There is yet another need for the finished slot to provide a sturdy opening for the strip of fabric to pass through. There is a further need for an adjustable shirt collar that creates an appealing look and allows the wearer to conceal the apparatus of the expandable shirt collar.

SUMMARY OF THE INVENTION

Aspects of the present invention provide a self-adjusting shirt collar that provides a comfortable fit for the wearer.

One aspect of the present invention relates to a collar. The collar includes a neckband assembly, a flap, an extendable elastic strip, a fabric strip, a button, a horizontal buttonhole, and a finished fabric strip slot (hereinafter referred to simply as the finished slot). The elastic strip is secured to a neckband by stitching. The neckband has the finished slot secured near one end of the neckband. Moreover, the fabric strip is attached to a free end of the elastic strip and a button is secured to a free end of the fabric strip. A buttonhole is provided on an end of the neckband opposite the button end, such that the buttonhole is configured to receive the button upon extending the fabric strip outward through the finished slot. The fabric strip is covered and concealed when retracted inward through the finished slot and not in use.

In another aspect of the invention, the neckband assembly has an inner band and an outer band. The fabric strip extends from the outside of the outer band and through the finished slot, which allows the fabric strip to automatically be hidden when retracted. Also, the finished slot allows an operating length of the fabric strip to be adjusted, such as, for example, to increase the circumference of the collar.

In yet another aspect of the present invention, the finished slot is formed by folding a button end of the outer band back onto itself, i.e., onto an outer or first side thereof, to define a vertically extending folded edge. A pair of short stitches is sewn into the outer band parallel to the folded edge. One of the short stitches extends from a bottom edge of the outer band and extends upward while the other short stitch extends from a top edge of the outer band and extends downward, wherein free ends of the short stitches oppose each other across a predetermined distance that defines a region which forms the slot.

A cut is then made along the fold of the folded edge to form two flaps, i.e., first and second flaps, and an end piece of the outer band is folded back flat towards the inner or second side of the outer band. One of the flaps, i.e., the first flap, is then folded onto the second or inner side of the outer band such that the first and second flaps are flat. A pair of vertically extending stitches is then sewn onto the flaps, each vertically extending stitch extends from the bottom edge of the outer band to the top edge thereof on either side of the slot to secure the flaps to the outer band and define the slot therebetween. The slot is defined by cutting a hole sized to permit the fabric strip to pass therethrough, the hole being formed in the region between the opposing ends of the short stitches.

The resulting finished slot is stronger and more secure than conventional buttonhole type openings that are prevalent in collars, resistant to fraying with repeated use, and less inclined to wash out. Furthermore, the adjustable collar with the finished slot is more durable, better quality, and provides the shirt with an adjustable collar having a longer life.

It should be noted that in one embodiment, the top and bottom corners of each flap are cut to provide a clean edge. In yet another embodiment, a fusible interlining may be joined to the inner or second side of the outer band, wherein a slot is formed in the interlining corresponding to the slot formed in the outer band.

The extendable elastic and fabric strips are then attached to the inner band. As such, the fabric strip is able to slide through the finished slot unimpeded so as to not place any constricting pressure on the throat of the wearer. Moreover, the fabric strip does not place strain on the elastic strip or fabric strip stitching, which could eventually disengage the elastic strip or fabric strip, or both, from the collar. Moreover, because there is no interruption when maneuvering the fabric strip through the finished slot, the wearer does not have to aggressively pull the button or the fabric strip to button the collar. As a result, the button stitching is not susceptible to loosening. Finally, the button is attached to prevent the fabric strip from being drawn inadvertently back through the finished slot and away from the outer side of the outer band.

Additional advantages and novel features of the present invention will become apparent from the following description.

DETAILED DESCRIPTION OF THE PRESENT INVENTION

As shown in FIGS. 1-6, the present invention includes an adjustable shirt collar 10 having an elastic strip 19, a fabric strip 14 attached to the elastic strip 19, and a button 50 attached to an end of the fabric strip 14. The present invention, as disclosed herein, allows for self-adjustment of the circumference of the shirt collar 10 to provide a comfortable fit to the wearer.

Figure 1:
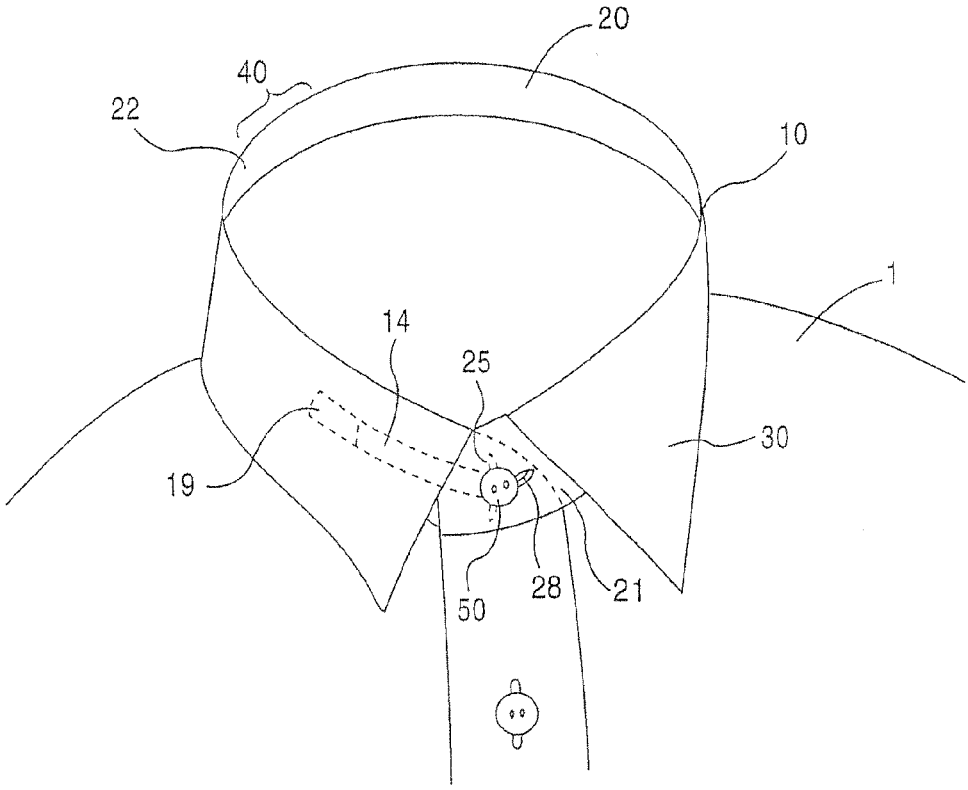
FIG. 1 is a partially transparent perspective view of a buttoned shirt with an expandable collar, in accordance with one aspect of the present invention.

In particular, FIG. 1 illustrates a shirt 1 having the collar 10 sewn thereon. The collar 10 includes a multi-layered neckband assembly 20 and a multi-layered flap 30, which may fold up or down over a crease 40 between the neckband assembly 20 and the flap 30. It is within the scope of the invention to form the crease 40 between the neckband assembly 20 and the flap 30 by stitching the flap 30 to the neckband assembly 20. Furthermore, if the collar 10 is manufactured as a single (or multi-layered) outer piece and inner piece of fabric, respectively, the crease 40 is formed over a plane between the neckband assembly 20 and the flap 30.

Additionally, the neckband assembly 20, as shown in FIGS. 1-4, includes an outer band 21 and inner band 22 with a finished fabric strip slot 25 defined at a first end 21a of the outer band 21. The finished slot 25 defines an opening that is vertical relative to a buttonhole 28 defined at a second free end 21b of the outer band 21. See FIGS. 1-4 and 6. The buttonhole 28 is horizontal and has a longitudinal axis extending in a direction substantially parallel relative to a longitudinal axis of the neckband assembly 20. Furthermore, as shown in FIGS. 1-5, the finished slot 25 has a longitudinal axis extending orthogonally relative to the longitudinal axis of the horizontal buttonhole 28 and neckband assembly 20.

Figure 2A:
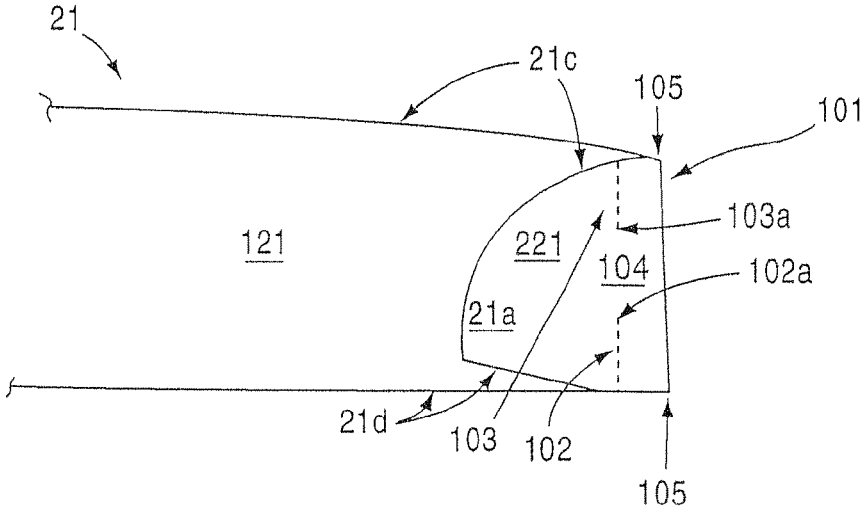
FIGS. 2A-2C are sketches illustrating the process of forming a finished slot in an outer band of the expandable collar illustrated in FIG. 1.
Figure 2B:
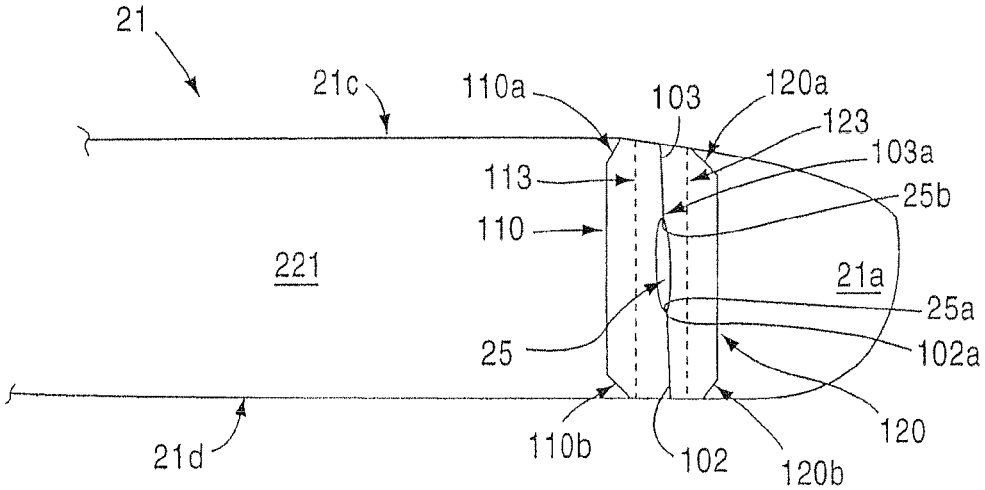
Figure 2C:
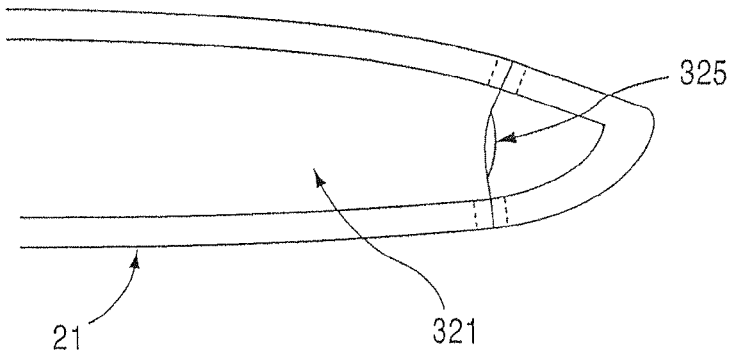
Figure 3:
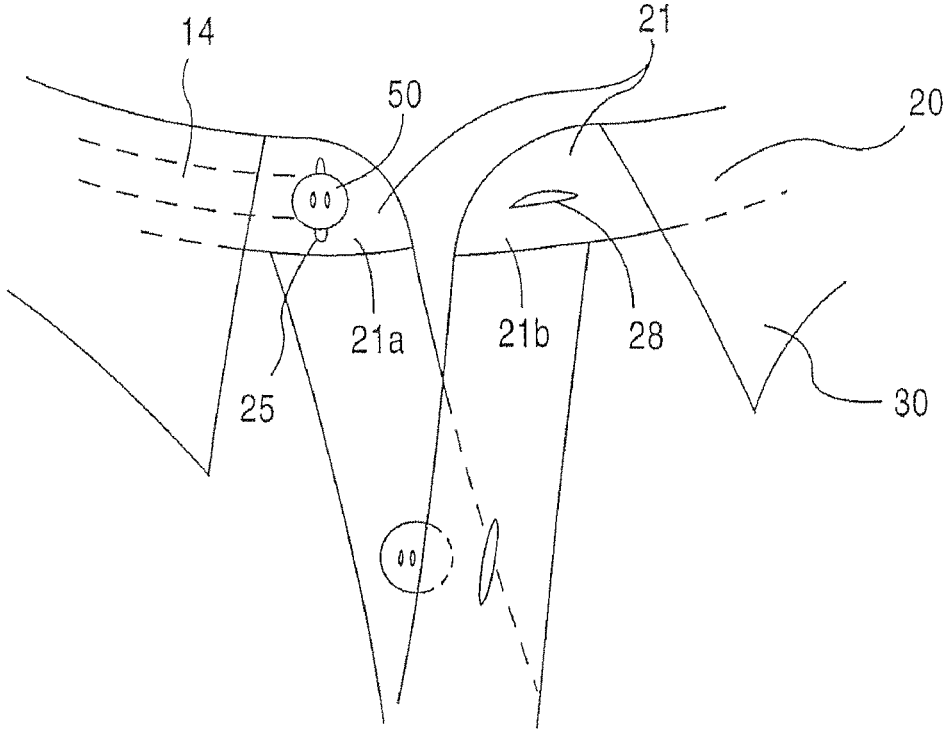
FIG. 3 is an enlarged view of an open shirt collar with a retracted expandable elastic strip, in accordance with one aspect of the present invention.

FIGS. 2A-2C are sketches illustrating the process in which the finished slot 25 is formed in the first end 21a of the outer band 21.

Referring to FIGS. 2A-2B, the outer band 21 includes an outer or first surface 121 and an inner or second surface 221 on the opposite side of the band 21. The outer surface 121 faces away from the wearer while the inner surface 221 faces toward the inner band 22 and the wearer. The first end 21a of the outer band 21 is folded back onto the outer surface 121 thereof, to define a vertically extending folded edge 101 and expose the inner surface 221 of the outer band 21 at a region including the first end 21a.

A pair of short stitches 102, 103 is sewn into the outer band 21 parallel to the folded edge 101. A first short stitch 102 of the pair of short stitches extends from a bottom edge 21d of the outer band 21 upward toward an upper edge 21c of the outer band 21 while a second short stitch 103 extends from the upper edge 21c of the outer band 21 downward toward a bottom edge 21d of the outer band 21. Free ends 102a and 103a of the short stitches 102 and 103, respectively, oppose each other across a region 104 within which the finished slot 25 is to be formed. While the distance which the stitches 102 and 103 extend toward each other may vary depending on factors such as the height of the outer band 21, it should be noted that the length of the region 104 must be sized or configured to permit the slot 25 to be formed therein such that the slot 25 permits the fabric strip 14 to pass therethrough yet prohibit the button 50 attached to the end thereof from also passing therethrough.

A vertical cut 105 is then made along the fold of the folded edge 101 from the bottom edge 21d to the upper edge 21c or vice versa to form two flaps, i.e., first flap 110 and second flap 120, and the first end piece 21a of the outer band 21 is folded back towards the inner or second side 221 of the outer band 21 to be flat. The first flap 110 is then folded over the cut 105 onto the second or inner side 221 of the outer band 21 such that the first flap 110 and the second flap 120 are flat relative to the second or inner side 221.

Vertically extending stitches 113 and 123 are then sewn onto a corresponding flap 110 and 120, respectively, wherein each vertically extending stitch 113 and 123 extends from the bottom edge 21d of the outer band 21 to the top edge 21c thereof. The vertically extending stitches 113 and 123 secure the flaps 110 and 120, respectively, to the outer band 21. The finished slot 25 is then formed, preferably by cutting or any other suitable manner, between the vertically extending stitches 113 and 123 and in the region 104 defined between the opposing ends 102a and 103a of the short stitches 102 and 103. It should be noted that it is within the scope of the present invention for the free end 102a of the short stitch 102 to abut a lower portion 25a of the slot 25 while the free end 103a of the short stitch 103 abuts the upper portion 25b of the slot 25. Therefore, the short stitches 102 and 103, as well as the vertically extending stitches 113 and 123 help provide a finished slot 25 that is more secure, better looking, stronger, and less likely to wash out or fray with repeated passing of the fabric strip 14 therethrough.

It should be noted that while it has been described herein for the first end 21a of the outer band 21, and the flaps 110 and 120 are stitched to the outer band 21, it is within the scope of the present invention for the end 21a and flaps 110 and 120 to be attached to the outer band by any known or later developed manner, such as, for example only, by using an adhesive.

It should be noted that in one embodiment, a top corner 110a and 120a and a bottom corner 110b and 120b of each flaps 110 and 120 are formed, preferably by cutting the flaps 110 and 120, to provide a clean edge. See FIG. 2B.

In yet another embodiment, as shown in FIG. 2C, a fusible interlining 321 may be joined to the inner or second side 221 of the outer band 21, wherein a slot 325 is formed in the interlining 321 which corresponds to or is aligned with the slot 25 formed in the outer band 21.

Figure 4:
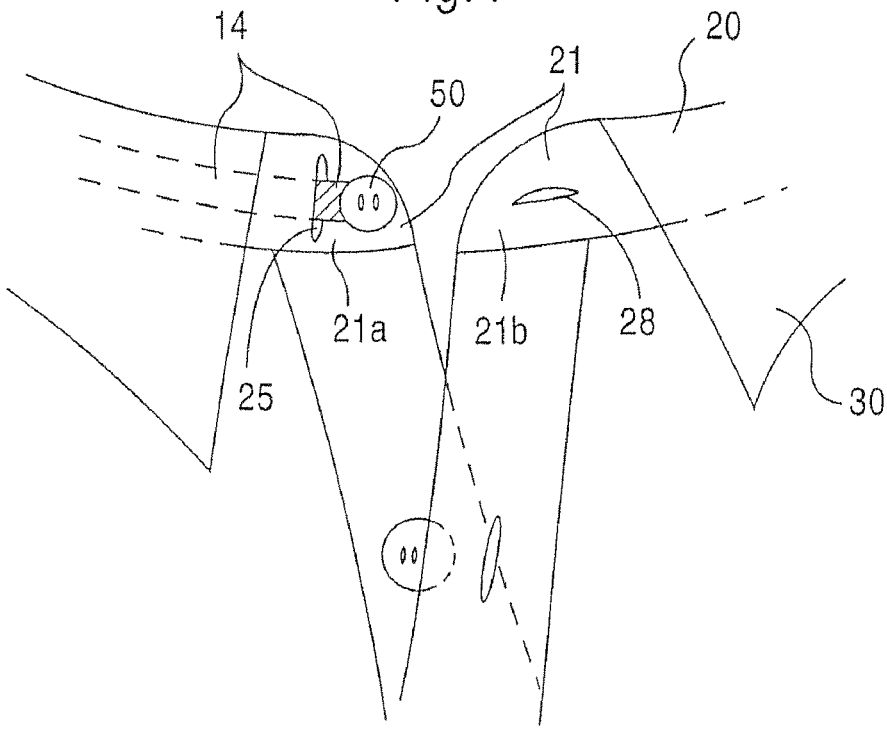
FIG. 4 is an enlarged view of an open shirt collar with the extended expandable elastic strip illustrated in FIG. 3.
Figure 5:
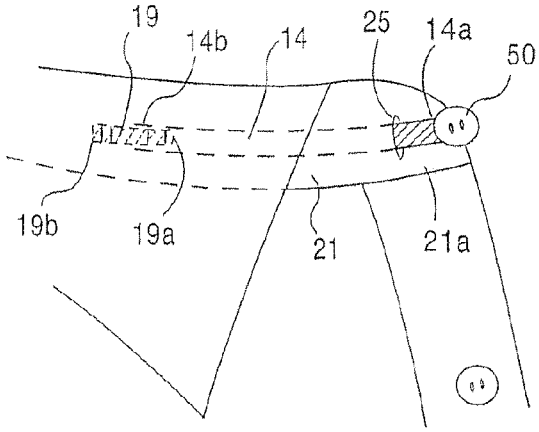
FIG. 5 is a fragmentary view of one end of the shirt collar illustrated in FIG. 1.
Figure 6:
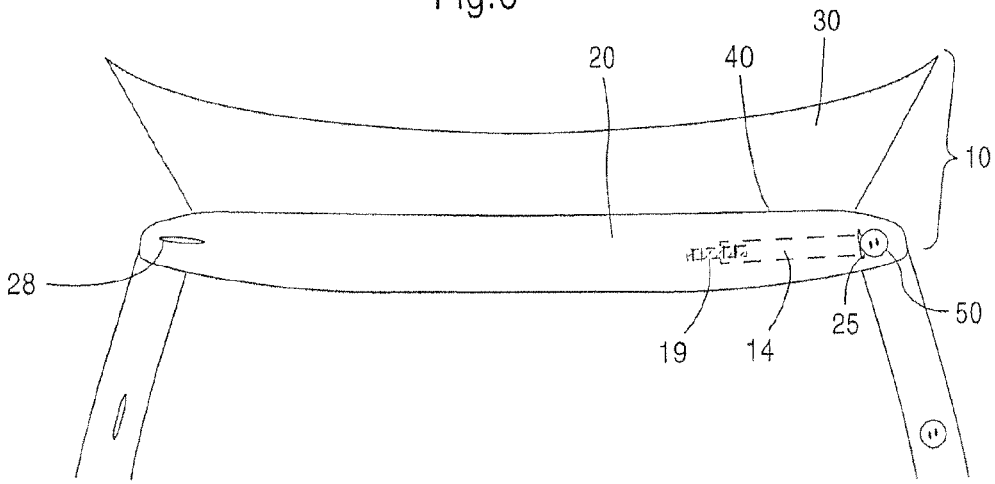
FIG. 6 is a rear (or outside) view of the fully opened shirt collar, in accordance with one aspect of the present invention.

Referring to FIG. 4, the elastic strip 19, is sewn using at least two bartacks to the underside of the outer band 21 prior to attaching the outer band 21 and inner band 22 together, along with the flap 30 to complete assembly of the adjustable shirt collar 10. The fabric strip 14, as shown in FIGS. 1-6 and particularly FIG. 5, is inserted from the outside into finished slot 25 at the first free end 21a of the outer band 21 until the button 50 contacts slot 25. It should be noted that the free end 19a of elastic strip 19 is sewn with at least two bartacks to the free end 14b of the fabric strip 14 and the button 50 is sewn on the free end 14a of the fabric strip 14 before the fabric strip 14 is passed through the slot 25. The button 50 may also pass through the horizontal buttonhole 28 to close the shirt collar 10. Moreover, the button 50 prevents the fabric strip 14 from inadvertently being drawn through the vertical finished slot 25.

The fabric strip 14, which is attached to the collar 10 by the elastic strip 19, may be manufactured in any color, design or material, e.g., plaid, satin, or the same color and material as the wearer's tie, but particularly, in the same color and of the same material as the shirt 1. The fabric strip 14 extends along the length of the collar 10 when the wearer grasps the button 50 and inserts the button 50 through the horizontal buttonhole 28 such that the second end 21b overlaps the first end 21a of the outer band 21. See FIGS. 1 and 3-4. The fabric strip 14 is hidden inside the outer band 21 and inner band 22 when the fabric strip 14 is retracted.

The elastic strip 19 and fabric strip 14, when attached to the collar 10 through the vertical finished slot 25, functions to expand the circumference of the neckband assembly 20, as needed, when the fabric strip 14 is buttoned into the horizontal buttonhole 28. By expanding the circumference of the neckband assembly 20, the wearer may maximize the comfort of the shirt collar 10.

Additionally, many modifications may be made to adapt the teachings of the expandable collar of this invention to particular situations or materials without departing from the scope thereof. For example, while the flaps 110 and 120 are discussed above as extending vertically from the bottom edge 21d to the upper edge 21c of the outer band 21, it is envisioned that the flaps 110 and 120 extend a length corresponding to a height of the slot 25. Therefore, this invention should not be limited to the particular embodiments disclosed herein, but includes all embodiments within the spirit and scope of the disclosure.

What is claimed is:

1. An adjustable collar of a shirt, the collar comprising:

a neckband assembly, having a first end and a second end, extends along a circumference of the collar and comprises an outer band and an inner band, the outer band having an inner side facing the inner band;

an extendable elastic strip having a first end secured to an underside of the outer band *and which* extends [through] *toward* a finished slot defined in the first end of the outer band;

a fabric strip having a first end secured to a free end of the elastic strip;

a button secured to a free end of the fabric strip;

a buttonhole defined in the second end of the neckband assembly and configured to receive the button upon extension of the elastic and fabric strip assembly; and a pair of flaps defined only by a first portion of the inner side of the outer band engaging a second portion of the inner side of the outer band, wherein only the pair of flaps define the finished slot by abutting each other.

2. The adjustable collar according to claim 1, wherein the outer band further includes an outer side facing away from a direction in which the inner side faces.

3. The adjustable collar according to claim 2, wherein the flaps are formed on the inner side of the outer band.

4. The adjustable collar according to claim 3, wherein the flaps are affixed to the inner side of the outer band by fixing means.

5. The adjustable collar according to claim 4, wherein the fixing means include any one of stitching and an adhesive.

6. The adjustable collar according to claim 1, wherein each flap is affixed to the outer band by stitching extending in a direction parallel to a longitudinal axis of the finished slot.

7. The adjustable collar according to claim 1, wherein the flaps extend from a bottom edge of the outer band to an upper edge of the outer band.

8. The adjustable collar according to claim 1, wherein first stitching extends from an upper portion of the finished slot to an upper edge of the outer band and second stitching extends from a bottom portion of the finished slot to a lower edge of the outer band.

9. The adjustable collar according to claim 1, wherein at least one of an upper corner and a lower corner of each flap is cut to provide each flap with at least five sides.

10. The adjustable collar according to claim 9, wherein the cut upper and lower corners are located remotest relative to the finished slot.

11. The adjustable collar according to claim 1, wherein a fusable interlining band is affixed to an inner side of the outer band.

12. The adjustable collar according to claim 11, wherein the fusable interlining band includes an interlining slot that is aligned with the finished slot of the outer band.

13. The adjustable collar according to claim 1, wherein the finished slot extends in a vertical direction that is orthogonal relative to a longitudinal axis of the elastic and fabric strip assembly.

14. The adjustable collar according to claim 1, wherein a diameter of the button is larger than a diameter of the finished slot, and wherein the button is prevented from passing through the finished slot.

15. The adjustable collar according to claim 1, wherein the first end of the elastic strip is secured to an inner side of the outer band by bar tacking.

16. The adjustable collar according to claim 1, wherein the first end of the fabric strip is secured to the free end of the elastic strip by bar tacking.

17. The adjustable collar according to claim 1, wherein the second end of the outer band overlaps the first end of the outer band portion of the neckband assembly when the button passes through the finished slot.

* * * * *